United States Patent
McQuilken

(10) Patent No.: US 7,481,029 B2
(45) Date of Patent: Jan. 27, 2009

(54) ZONE ACCESS FLOOR NETWORK DISTRIBUTION SYSTEM

(76) Inventor: Bruce McQuilken, 1833 N. 105th St., Ste 200, Seattle, WA (US) 98133

( * ) Notice: Subject to any disclaimer, the term of this patent is extended or adjusted under 35 U.S.C. 154(b) by 0 days.

(21) Appl. No.: 11/901,243

(22) Filed: Sep. 14, 2007

(65) Prior Publication Data

US 2008/0135287 A1  Jun. 12, 2008

Related U.S. Application Data

(60) Provisional application No. 60/845,139, filed on Sep. 14, 2006.

(51) Int. Cl.
*E04F 15/024* (2006.01)
*E04B 5/43* (2006.01)
*H02G 3/12* (2006.01)
*H02G 3/08* (2006.01)

(52) U.S. Cl. .................... 52/220.5; 52/263; 174/50; 174/486; 200/51 R

(58) Field of Classification Search ............... 52/263, 52/220.3, 480; 174/67, 495, 486, 58, 59, 174/48; 200/51 R, 51.02, 51.03, 51.04, 51.05, 200/51.06, 51.11; 220/3.3; 361/641, 601, 361/622, 627, 628, 631–633, 636–640, 643, 361/644, 647, 648, 651, 658; 379/99, 198, 379/199, 441, 445, 451; 439/310, 157, 159, 439/209, 577

See application file for complete search history.

(56) References Cited

U.S. PATENT DOCUMENTS

| | | | | |
|---|---|---|---|---|
| 2,650,331 | A * | 8/1953 | Clark | .................. 361/643 |
| 5,434,355 | A * | 7/1995 | Sho | .................... 174/487 |
| 5,673,522 | A * | 10/1997 | Schilham | .............. 52/263 |
| 5,675,950 | A * | 10/1997 | Schilham | .............. 52/263 |
| 5,713,168 | A * | 2/1998 | Schilham | ............ 52/220.5 |
| 5,796,037 | A * | 8/1998 | Young et al. | .......... 174/50 |
| 7,045,706 | B1 * | 5/2006 | Lincoln et al. | ........ 174/482 |
| 7,183,504 | B2 * | 2/2007 | Byrne | ................. 174/486 |

\* cited by examiner

*Primary Examiner*—Michael A Friedhofer
(74) *Attorney, Agent, or Firm*—Varnum, Riddering, Schmidt & Howlett LLP

(57) ABSTRACT

An access floor line distribution system that includes a low profile access floor system with a low profile switch box placed inside a switch box vault formed in the floor system. The access floor system is designed to be six inches or less in height and includes support props formed in a grid pattern and covered by floor panels. The props are sufficiently spaced apart to form a vault in the floor system designed to house the switch box. Formed on the switch box is a telecommunication cable opening, and a duplex electrical plug opening. Formed on the opposite side of the switch box is a plurality of knock-outs opening through which network cables extend. A plurality of air vents are formed on the sides of the box to increase air flow and heat distribution. Located inside the switch box is a low profile network switch. The network switch includes a main telecommunication input port and a power cable on one surface and plurality of network ports on an opposite surface. Attached to the inside surface of the switch box is at least one adjustable bracket that holds the network switch it in a fixed position inside the switch box. Disposed over the top opening of the box is a rigid cover which is held in position by suitable connectors.

12 Claims, 3 Drawing Sheets

ZONE ACCESS FLOOR NETWORK DISTRIBUTION SYSTEM

This is a utility patent application which claims benefit of U.S. Provisional Application No. 60/845,139 filed on Sep. 14, 2006.

BACKGROUND OF THE INVENTION

1. Field of the Invention

This invention relates to telecommunication switches, and more particularly to telecommunication switches used in a low profile access floor system.

2. Description of the Related Art

Low profile access floor systems, such as the one shown in U.S. Pat. No. 4,905,437, and conventional adjustable height floor systems six inches or less in height, are commonly used to distribute electrical and telecommunication wires in the floor of office buildings, schools and other buildings in which a high concentration of networked computers are used. The low profile access floor systems are of particular importance because, unlike high profile (above six inches) conventional access floors, they can be incorporated into new building designs or retrofitted to existing structures with little or no impact on the engineering, structure or spatial allocation of the building. Additionally, they provide a dedicated, flexible, accessible environment for power distribution and telecommunication cabling infrastructure. Such systems include a structural support system spaced at predetermined intervals that support removable access panels in a grid pattern and create space between the structural sub floor and the deck of the access floor (formed by access panels) to form a continuous hollow space or contiguous cable raceways that extends the entire length and width of the building. Electrical power cables and telecommunication lines and cables may be placed in the hollow spaces or raceways.

The electrical and telecommunication lines located in the floor of an building are typically connected to a floor electrical circuit panel and to an intermediate distribution frame (IDF) located in a telecommunication distribution closet located on each floor. Floor electrical and telecommunication distribution wires and cables extend from the floor electrical circuit panel and the IDF to a main electrical panel and main distribution frame (MDF), respectively, located in a utility closet located at the service entry to the building. The main electrical panel and MDF connect to large, outside electrical distribution trunk lines and telecommunication trunk lines, respectively, that service the geographical area around the building.

The telecommunication lines which may be either copper wire and/or fiber optic cables, articulated from the MDF through stair wells or elevator shafts or by other routes to the IDF located on the individual floors. From the IDF, the telecommunication wires and cables are then commonly extended through suspended ceilings, walls, power poles, surface mounted ducts, in slab trench duct, pillars and system furniture, in some combination, to the individual personal computer work stations in the space. If a low profile access floor system is used, such as the floor system shown and described in U.S. Pat. No. 4,905,437, the wires and cables may be extended through the floor to various areas throughout the tenant's space.

Tenants need different amounts of space, different build outs and different work area or classroom configurations. Before a tenant occupies a building space, the desired walls, doors, counters, build outs, electrical wires and outlets that fit the needs of the tenant must be constructed. During construction, the distribution and installation of all telecommunication wires, cables and connection ports are installed as well. Even existing tenants, sometimes require changes to the interior walls, doors, counters, furniture layout or communication network configuration which, in turn require the re-positioning of electrical wires, outlets, the telecommunication wires and cables and connection ports. Depending on the extent of change, the cost of these changes can be relatively large and sometimes prohibitive. A major factor that increases the overall cost of changing and existing layout is the cost and installation of the copper wire or cable used in telecommunication network.

The cost of copper wire telecommunication network infrastructure has increased dramatically in recent years due to world demand for copper, petrochemical products (insulators for communication wire), the constant requirement for greater network band width (the industry standard for copper communication transmission speed has been reestablished four times in the past eight years), and changes in the U.S. National Electrical Code that requires discontinued or abandoned communication cabling to be removed from buildings.

SUMMARY OF THE INVENTION

It is an object of the present invention to provide a zone, low profile access floor network distribution system for high speed copper conductor telecommunication cables and fiber optic cables.

It is another object of the present invention to provide such a system that reduces the cost of installation and maintenance of modem telecommunication local area networks in new and existing buildings.

It is the object of the present invention to provide such a system that is compatible with current and anticipated future telecommunication network standards.

These and other objects are met by the network distribution system disclosed therein designed to be used with a low profile access floor system approximately 6 inches or less in height. In the preferred embodiment, the system includes a rigid switch box with four straight side walls and a flat bottom panel. Disposed over the top opening of the switch box is a flat, removable cover panel. In the preferred embodiment, a rigid floor cover replaces a standard floor access panel used in the low profile access floor system and covers the vault-like cavity, called a switch box vault, in the floor that houses the switch box. In low profile access floor systems taller between 2.5 inches to 6 inches in height, the switch box is mounted inside the switch box vault and under the floor deck. Depending on the type of low profile floor system used, the floor cover may be supported at its corners by the existing floor structure members or by the switch box itself.

In the preferred embodiment, a plurality of air vents is formed on the sidewalls of the switch box to allow circulation of air generated by an internal fan located in a network switch placed inside the switch box. In the preferred embodiment, outward extending lips are formed along the upper edges of the four side walls designed to extend over the top surface of the adjacent support props used on the access floor system. Formed on the rear surface of the switch box are a plurality of knockout openings.

A low profile network switch is designed to fit inside the switch box. In the preferred embodiment, the network switch is a standard, 'active' multiple port network switch and includes a main telecommunication input port that connects to a high speed input telecommunication cable and a power cable that connects to an electrical receptacle mounted on the side of the switch box. Mounted on the rear surface of the network switch is a plurality of network ports. Two adjustable mounting brackets are used to securely attach the network switch in a fixed position inside the switch box. The location of the brackets may be adjusted inside in the switch box thereby allowing the switch box to be used with different size network switches.

During assembly, a plurality of copper core network patch cords extend through the rear knockout openings on the switch box and connect to the network ports. The opposite ends of the patch cords connect to receptacles located within the designated floor plan zone in the building.

DESCRIPTION OF THE PREFERRED EMBODIMENT(S)

Figure 1:
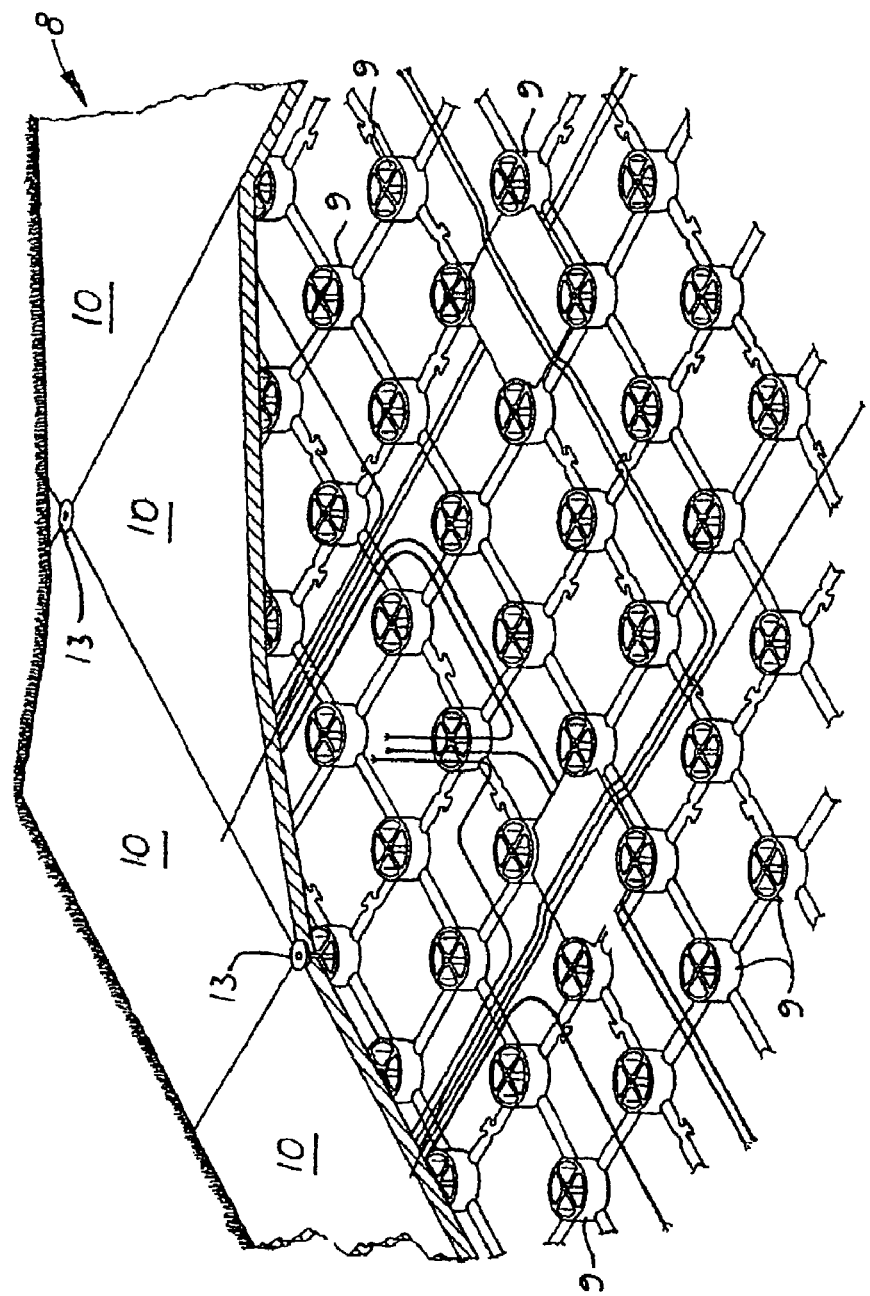
FIG. 1 is a perspective view of an access floor system used in the prior art.
Figure 2:
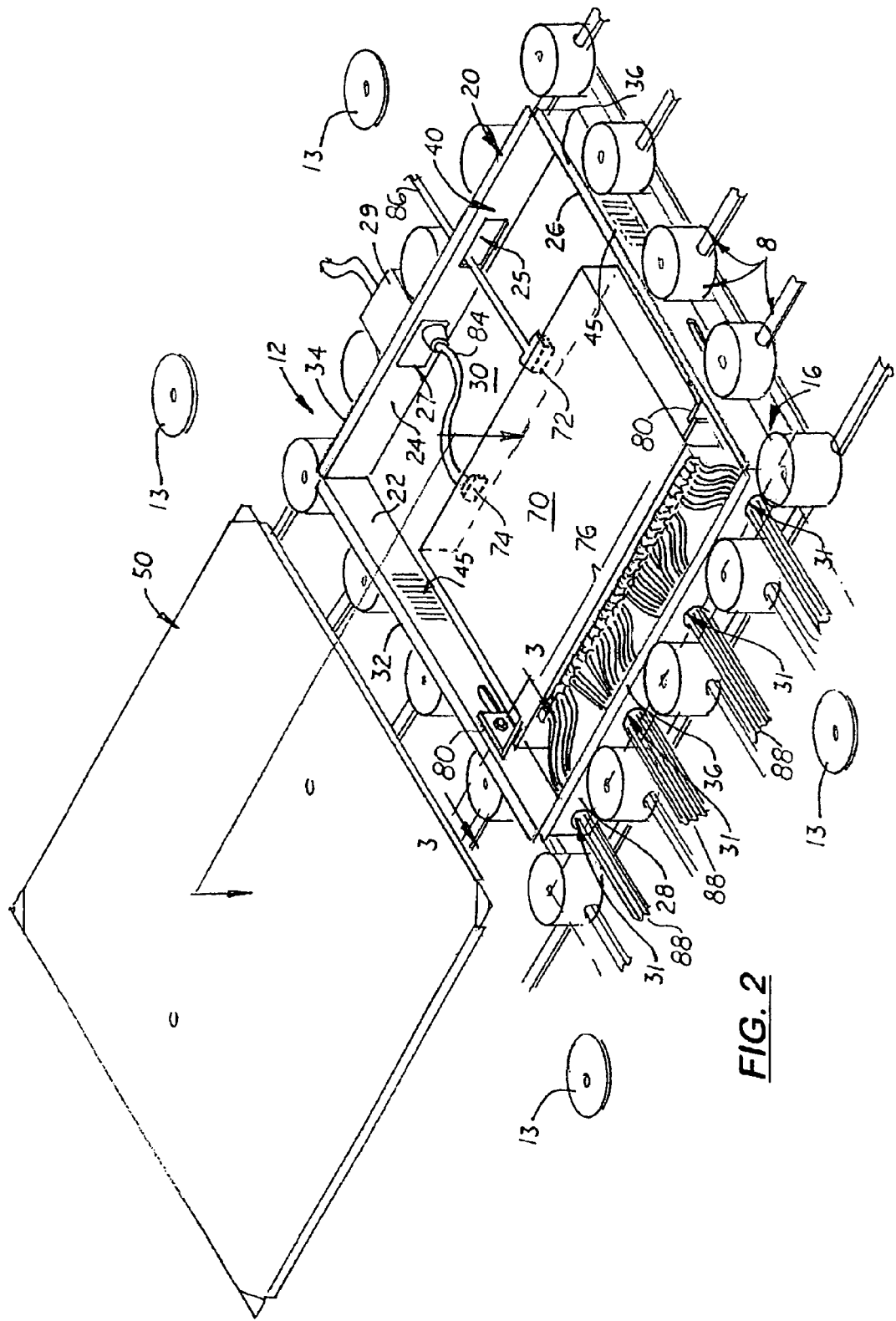
FIG. 2 is a perspective view of an access floor system with a switch box mounted therein.

Referring to the accompanying FIGS. 2, there is shown an access floor line distribution system, designated 12, designed to be used with an existing low profile access floor system 8 such as shown in FIG. 1, which was disclosed in U.S. Pat. No. 4,905,437 and now incorporated therein by reference. Such a floor system 8 includes a plurality of short support props 9 used to support rigid floor panels 10. In the system 12 disclosed herein, the floor system 8 is modified by removing some of the support props 9 to create a square or rectangular shaped switch box vault 16.

Figure 3:
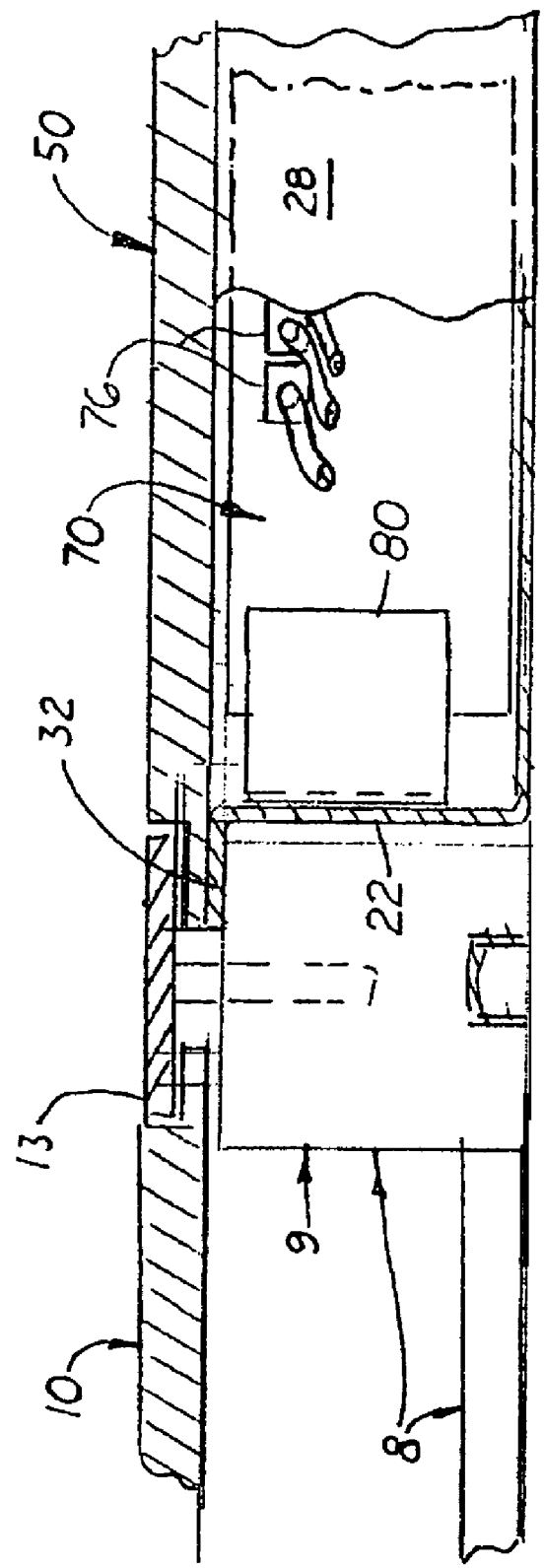
FIG. 3 is a sectional side elevation view taken along line 3-3 in FIG. 2 showing a switch box mounted inside a switch box vault formed in a low profile access floor system with a network switch mounted inside the switch box covered by a cover panel.

When a switch box vault 16 is created in the floor system 8, a square or rectangular switch box 20 is placed therein. In the preferred embodiment, the switch box 20 has a square configuration with four straight side walls 22, 24, 26, 28 and a flat bottom panel 30. Formed along the upper edges of the four side walls 22, 24, 26, 28 are four outward extending lips 32, 34, 36, 38, respectively, designed to extend horizontally over the top surface of an adjacent support prop 9, as shown in FIG. 3, to securely hold the switch box 20 inside the vault 16.

Formed on the front side wall 24 is a telecommunication opening 25 and a duplex electrical plug opening 27. Disposed inside the electric plug opening 27 is an electrical outlet 29. Formed on the rear sidewall 28 of the switch box 20 opposite the telecommunication opening 25 and plug opening 27 are a plurality of knockout network cable openings 31. In the preferred embodiment, a plurality of air vents 45 are formed on the side walls 22, 26 of the box 20 to increase air distribution to facilitate cooling of the network switch 70 placed inside the switch box 20 during installation.

A top opening 40 is formed over the switch box 20 which is later covered by a rigid flat cover panel 50. The cover panel 50 which replaces a rigid floor panel 10, is attached to the support props 9 located at the corners of the switch box vault 16 by corner clamps 13, which are used in the system 12 disclosed in the '437 patent.

Located inside the switch box 20 is a standard, 24 port, rack mount, 10/100/1000, network switch 70. In the preferred embodiment, the network switch 70 includes a main telecommunication input port 72 and a power connector port 74 on its front surface and a plurality of network outlet ports 76 on its rear surface. Attached to the inside surface of the switch box 20 are two adjustable brackets 80, 82, that attach to the end or sides of the network switch 70 to hold it in a fixed position inside the switch box 20. In the preferred embodiment, the network switch 70 is electrically activated and includes a power cord 84 that plugs into the outlet 29 which is installed in the electric plug opening 27. During use, the main telecommunication cable 86 extends through the telecommunication opening 25 and connects to the main telecommunication port 72 on the network switch 70. A plurality of network cables 88 extend through the knockout openings 31 and connect to the network ports 76 on the rear surface of the network switch 70.

The network switch 70 may include an optional cooling fan (not shown).

In the preferred embodiment, the switch box 20 is made of 16 gauge reinforced sheet metal or aluminum and measures approximately 21.5 inches×21.5 inches×2.25 inches (W×L×H). The flat cover 50 is made of eight gauge reinforced sheet metal or aluminum and measures approximately 23.5 inches× 23.5 inches and 0.65 inches (W×L×H). The switch box 20 includes six knockout openings 31 for the network patch cords 88. The industry standard network switch 70 measures 19 inches×12 inches×1.75 inches (W×L×H). The actual size of the network switch 70 may vary depending on model and manufacturer. In the preferred embodiment, the network switch 70 includes 24 network ports.

In compliance with the statute, the invention described herein has been described in language more or less specific as to structural features. It should be understood however, that the invention is not limited to the specific features shown, since the means and construction shown, is comprised only of the preferred embodiments for putting the invention into effect. The invention is therefore claimed in any of its forms or modifications within the legitimate and valid scope of the amended claims, appropriately interpreted in accordance with the doctrine of equivalents.

I claim:

1. A zone access floor network distribution system, comprising:
   a. a low profile access floor system six inches or less in height that includes a series of floor support modules each including a plurality of props arranged in a grid pattern, formed inside said grid pattern is a switch box vault;
   b. a switch box disposed inside at least one said switch box vault, said switch box including at least one telecommunication opening, an electrical duplex receptacle, a plurality of network cable openings;
   c. means for fixing said switch box inside said switch box vault;
   d. at least one network switch disposed inside said switch box, said network switch including a power cable, at least one telecommunication port and a plurality of network ports;
   e. means for holding said network switch in fixed position inside said switch box; and,
   f. a rigid floor cover that extends over said switch box vault.

2. The distribution system, as recited in claim 1, wherein said switch box is sufficient height so that said floor cover when placed over and supported by the switch box may act as a floor panel for said floor system.

3. The distribution system, as recited in claim 2, an electrical outlet attached to side switch box.

4. The distribution system, as recited in claim 2, wherein said means for securing said switch box within said switch box vault is an extending lip structure formed on said switch box that extends over surrounding props used on said access floor system.

5. The distribution system, as recited in claim 1, wherein said switch box includes a plurality of air vents enabling air to be exchanged in said switch box.

6. The distribution system, as recited in claim 5, wherein said switch box is sufficient height so that said floor cover when placed over and supported by the switch box may act as a floor panel for said floor system.

7. The distribution system, as recited in claim 5, an electrical outlet attached to side switch box.

8. The distribution system, as recited in claim 5, wherein said means for securing said switch box within said switch box vault is an extending lip structure formed on said switch box that extends over surrounding props used on said access floor system.

9. The distribution system, as recited in claim 1, an electrical outlet attached to side switch box.

10. The distribution system, as recited in claim 1, wherein said means for securing said switch box within said switch box vault is an extending lip structure formed on said switch box that extends over surrounding props used on said access floor system.

11. A zone access floor network distribution system, comprising:

a. a low profile access floor system six inches or less in height that includes a series of floor support modules each including a plurality of props arranged in a grid pattern, formed inside said grid pattern is a switch box vault;

b. a switch box disposed inside at least one said switch box vault, said switch box including at least one telecommunication opening, an electrical duplex receptacle, a plurality of network cable openings and a plurality of air vents;

c. means for fixing said switch box inside said switch box vault;

d. at least one network switch disposed inside said switch box, said network switch including a power cable, at least one telecommunication port and a plurality of network ports;

e. means for holding said network switch in fixed position inside said switch box; and, f. a rigid floor cover that extends over said switch box and connects to said props on said access floor system.

12. The distribution system, as recited in claim 11, wherein said means for fixing said network switch inside said switch box vault is at least one clip connected between said switch box vault and said network switch.

* * * * *